United States Patent
Sakaguchi

(10) Patent No.: US 11,252,289 B2
(45) Date of Patent: Feb. 15, 2022

(54) IMAGE PROCESSING APPARATUS, INFORMATION PROCESSING METHOD, AND STORAGE MEDIUM

(71) Applicant: CANON KABUSHIKI KAISHA, Tokyo (JP)

(72) Inventor: Toru Sakaguchi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/039,007

(22) Filed: Sep. 30, 2020

(65) Prior Publication Data
US 2021/0112169 A1    Apr. 15, 2021

(30) Foreign Application Priority Data
Oct. 10, 2019  (JP) .............................. JP2019-187024

(51) Int. Cl.
*H04N 1/32* (2006.01)
*H04N 1/00* (2006.01)

(52) U.S. Cl.
CPC ..... *H04N 1/00413* (2013.01); *H04N 1/00411* (2013.01); *H04N 1/00416* (2013.01)

(58) Field of Classification Search
CPC ........... H04N 1/00411; H04N 1/00413; H04N 1/00416; H04N 1/00419; H04N 1/00421; H04N 1/00427
See application file for complete search history.

(56) References Cited

U.S. PATENT DOCUMENTS

2015/0293486 A1* 10/2015 Fukumoto .......... G03G 15/5016
399/81

FOREIGN PATENT DOCUMENTS

JP       2010-128380        6/2010

* cited by examiner

Primary Examiner — Hoang X Ngo
(74) Attorney, Agent, or Firm — Venable LLP

(57) ABSTRACT

According to one aspect of the present disclosure, an image processing apparatus in which a plurality of applications operates, the image processing apparatus comprises: a selection unit that selects, from the plurality of applications, one or more applications used for performing setting of a function; a setting unit that sets whether a setup screen for the one or more applications selected by the selection unit is displayed in a first mode or a second mode; and a display unit that displays the setup screen for the one or more applications in the first mode or the second mode based on information set by the setting unit, wherein one or more functions available in a setup screen displayed in the second mode are fewer than functions available in a setup screen displayed in the first mode.

16 Claims, 11 Drawing Sheets

FIG. 5

| Detail confirmation | | ☐ Copy | |
|---|---|---|---|
| Number of copies | 5 | Side | Both sides to both sides |
| Color mode | Monochrome | Page aggregation | 1 in 1 |
| Sheet size | A4 | Density | Normal |
| Magnification | 125% | Stapler | No |

Enter

Cancel

FIG. 8

| APPLICATION NAME | SUPPORTED BY UNIVERSAL UI | DISPLAY MODE SETTING |
|---|---|---|
| HOME WINDOW | Yes | NON-SPECIFIED (AUTO) |
| COPY | Yes | UNIVERSAL |
| SEND | No | N/A |
| FAX | Yes | STANDARD |
| SCAN | No | N/A |
| USE SAVED FILE | No | N/A |

FIG. 11

| APPLICATION NAME | SUPPORTED BY UNIVERSAL UI | DISPLAY MODE SETTING | DISPLAY MODE OF PREVIOUS DISPLAY |
|---|---|---|---|
| HOME WINDOW | Yes | NON-SPECIFIED (AUTO) | STANDARD |
| COPY | Yes | UNIVERSAL | UNIVERSAL |
| SEND | No | N/A | N/A |
| FAX | Yes | STANDARD | UNIVERSAL |
| SCAN | No | N/A | N/A |
| USE OF SAVED FILE | No | N/A | N/A |

# IMAGE PROCESSING APPARATUS, INFORMATION PROCESSING METHOD, AND STORAGE MEDIUM

BACKGROUND

Field

The present disclosure relates to an image processing apparatus, an information processing method, and a storage medium.

Description of the Related Art

In general, an MFP is often shared by multiple users. In particular, an MFP installed in a public place such as a convenience store is used by many unspecified users. It is therefore desirable that the MFP be easily operable for any users. Accordingly, in recent years, there have been MFPs that have a universal UI and enable switching between a standard UI and the universal UI. The standard UI as used herein is a UI on which all the functions can be set and which is intended for users who can perform complex setting and operation. On the other hand, the universal UI is a UI on which only some typical functions can be set and which provides high visibility to enable an intuitive operation and is intended to be easily operable for users who have difficulty in performing complex setting and operation or are unfamiliar with complex setting and operation. The user is able to switch the screen between the standard UI screen and the universal UI screen by selecting a display mode switching key, for example.

Once a user operates the operation unit of an MFP and selects an application such as print and scan (hereafter, referred to as "application"), the selected application is started up, and typically, a setup screen dedicated to the application is displayed. At this time, in an MFP having a universal UI, the application is typically started up in the previous display mode before started up. For example, if a fax application is selected when a copy application is displayed with the universal UI, the started up fax application is displayed with the universal UI. Contrarily, if a fax application is selected when a copy application is displayed with the standard UI, the started up fax application is displayed with the standard UI. In general, however, it is rare that all the applications provided in an MFP are supported by a universal UI, and mostly, those supported by a universal UI are only some of the applications. When the selected application is not supported by the universal UI (that is, supported only by the standard UI), the started up application is always displayed with the standard UI regardless of the previous display mode before started up.

When an application supported by the universal UI is started up in a state where an application not supported by the universal UI is displayed (which is always displayed with the standard UI), the application is always displayed with the standard UI. Accordingly, there is a problem that the user may have to frequently perform a display mode switching operation from the standard mode to the universal mode. For example, a case where a copy application is supported by the universal UI and a scan application is not supported by the universal UI and the user wants to always use the copy application with the universal UI is considered here. In such a case, when the copy application is started up in a state where the scan application is displayed (which is not supported by the universal UI and thus is always displayed with standard UI), the copy application will be always displayed with the standard UI, which is contrary to the user's intention. Therefore, to use the copy application with the universal UI, the user has to perform a display mode switching operation from the standard mode to the universal mode.

To address this, there is a technique to fixing display of a currently displayed application to the universal UI in response to a hold-down operation of the display mode switching key (see Japanese Patent Application Laid-Open No. 2010-128380, for example). With such a technique, even when an application supported by the universal UI is started up in a state where an application not supported by the universal UI is displayed (which is always displayed with the standard UI), it is possible to cause the application to be displayed with the universal UI. Therefore, the user is able to use the universal UI without performing a display mode switching operation, and this may resolve troublesomeness.

In the prior art described above, it is possible to fix display of each application to the universal mode but not possible to fix the display to the standard mode. Thus, when an application supported by the universal UI is started up in a state where an application supported by the universal UI is displayed with the universal UI, the started up application is always displayed with the universal UI. Accordingly, there is a problem that the user may have to frequently perform a display mode switching operation from the universal mode to the standard mode. For example, a case where both a copy application and a fax application are supported by the universal UI and the user wants to use the copy application always with the universal UI and use the fax application always with the standard UI is considered here. In such a case, when the fax application is started up in a state where the copy application is displayed with the universal UI, the fax application will be always displayed with the universal UI, which is contrary to the user's intention. To use the fax application with the standard UI, the user has to perform a display mode switching operation from the universal mode to the standard mode.

SUMMARY

According to one aspect of the present disclosure, an image processing apparatus in which a plurality of applications operates, the image processing apparatus comprises: a selection unit that selects, from the plurality of applications, one or more applications used for performing setting of a function; a setting unit that sets whether a setup screen for the one or more applications selected by the selection unit is displayed in a first mode or a second mode; and a display unit that displays the setup screen for the one or more applications in the first mode or the second mode based on information set by the setting unit, wherein one or more functions available in a setup screen displayed in the second mode are fewer than functions available in a setup screen displayed in the first mode.

Further features of the present disclosure will become apparent from the following description of exemplary embodiments with reference to the attached drawings.

BRIEF DESCRIPTION OF THE DRAWINGS

FIG. 5 is a diagram illustrating an example of a detail confirmation screen.

FIG. 8 is a diagram illustrating an example of a display mode information table for applications.

FIG. 11 is a diagram illustrating an example of a display mode information table for applications.

DESCRIPTION OF THE EMBODIMENTS

Embodiments of the present disclosure will be described below with reference to the drawings.

First Embodiment

Figure 1:
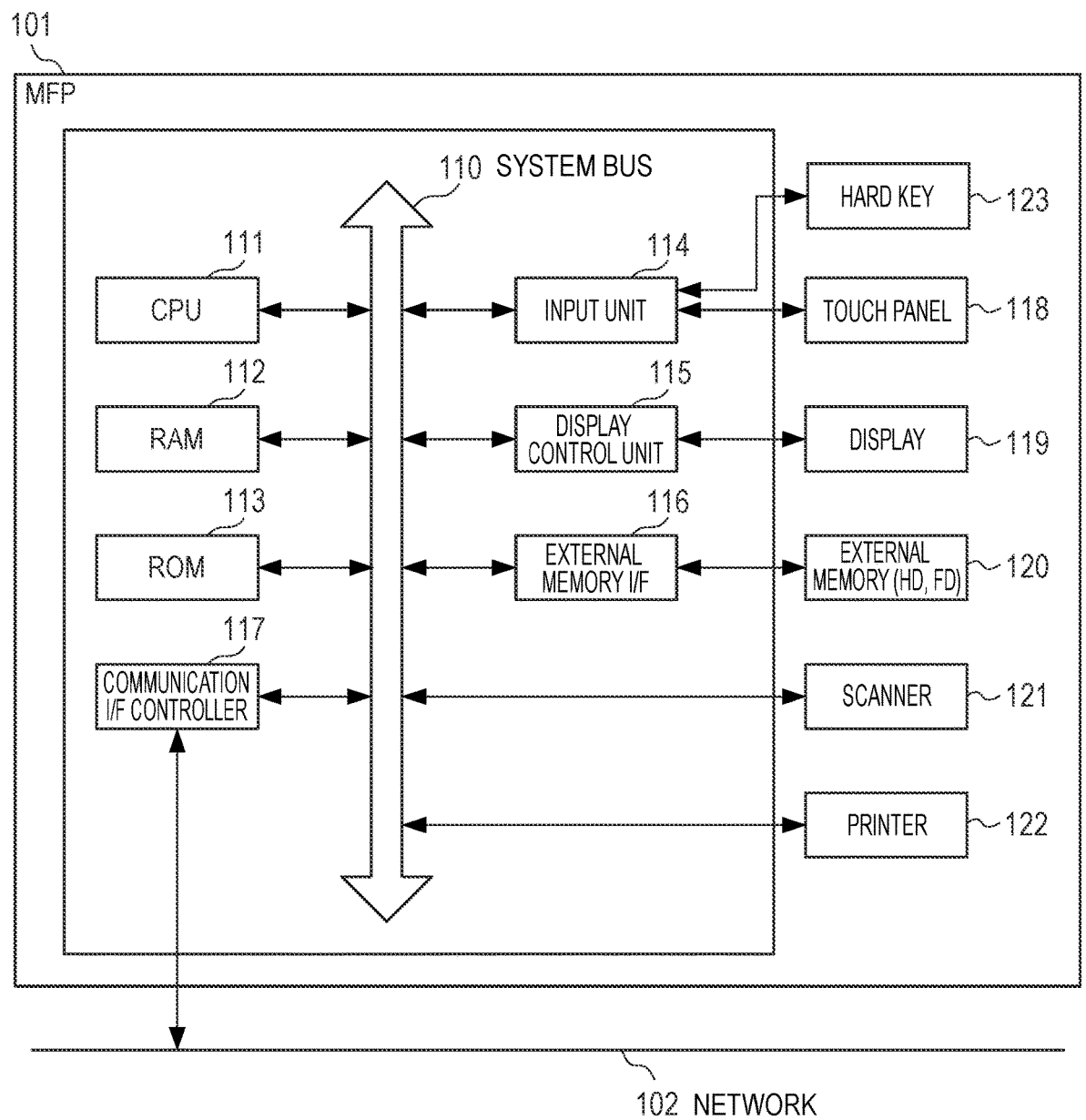
FIG. 1 is a diagram illustrating an example of a hardware configuration of an image processing apparatus.

First, a first embodiment will be described. FIG. 1 is a diagram illustrating an example of a hardware configuration of an image processing apparatus. In FIG. 1, description is provided with an example of a Multi Function Peripheral (MFP) as an image processing apparatus. An MFP 101 has a CPU 111 to a printer 122. The CPU 111, the RAM 112, the ROM 113, the input unit 114, the display control unit 115, the external memory I/F 116, and the communication I/F controller 117 are connected to a system bus 110. Further, the touch panel 118, a hard key 123, the display 119, and the external memory 120 are connected to the system bus 110. Each processing unit is configured to be able to transfer data with each other via the system bus 110.

The ROM 113 stores image data, other data, a control program of the CPU 111, or the like. Note that the control program is a control program that implements the embodiment described below. Further, the ROM 113 may include a type of a rewritable flash ROM or the like and also stores a setting value, management data, or the like registered by a user of the MFP 101. The RAM 112 is a volatile memory and stores some of setting values, management data, or the like registered by the user of the MFP 101, such as a program control variable, various work buffers, or the like. Further, the RAM 112 is also used as a main memory of the CPU 111, a temporary storage area such as a work area, or the like. The CPU 111 controls each component in the MFP 101 by using the RAM 112 as a work memory in accordance with a program stored in the ROM 113, for example. Note that the program for the operation of the CPU 111 may be pre-stored in the external memory (hard disk or the like) 120 without being limited to the ROM 113. The RAM 112, the ROM 113, and the external memory 120 are collectively referred to as a storage region.

The input unit 114 accepts a user operation, generates a control signal in accordance with the operation, and supplies the control signal to the CPU 111. For example, the input unit 114 accepts a user operation from a keyboard (not illustrated), a mouse (not illustrated), the touch panel 118, the hard key 123, or the like that function as input devices. Note that the touch panel 118 is an input device by which coordinate information in accordance with the position at which a plane input portion is touched is output, for example. Further, the hard key 123 is a physical button selected by the user. The CPU 111 controls each component of the MFP 101 in accordance with a program based on a control signal generated and supplied by the input unit 114 in response to a user operation performed on the input device. Thereby, the MFP 101 can perform an operation in accordance with a user operation.

The display control unit 115 outputs a display signal to cause the display 119 to display an image. For example, the CPU 111 supplies a display control signal generated in accordance with a program to the display control unit 115. The display control unit 115 generates a display signal based on this display control signal and outputs the display signal to the display 119. For example, the display control unit 115 causes the display 119 to display a GUI screen forming a GUI based on a display control signal generated by the CPU 111.

Note that the touch panel 118 is integrally formed with the display 119 and also functions as an operation unit. For example, the manufacturer forms the touch panel 118 so that transmittance of light does not prevent display of the display 119 and attaches the touch panel 118 on the upper layer of the display surface of the display 119. The manufacture then associates input coordinates in the touch panel 118 with display coordinates on the display 119. Thereby, a GUI is configured such that the user is able to directly perform an operation on a screen displayed on the display 119.

Further, the display 119 and the hard key 123 are arranged adjacent to each other on an operation panel 200.

The external memory 120, for example, a hard disk, an SSD, a CD, a DVD, a memory card, or the like can be attached to the external memory I/F 116. The external memory I/F 116 reads data from the attached external memory 120 and writes data in the external memory 120 based on control of the CPU 111. The communication I/F controller 117 communicates with various networks 102 such as a LAN, the Internet, a wired connection, a wireless connection, or the like, for example, based on the control of the CPU 111. Various devices such as a PC, another MFP, a printer, a server, or the like are connected to the network 102 so as to be able to communicate with the MFP 101.

The scanner 121 reads a document and generates image data. The printer 122 performs a print process based on a user instruction input via the input unit 114 and a command input from an external device via the communication I/F controller 117.

Figure 2:
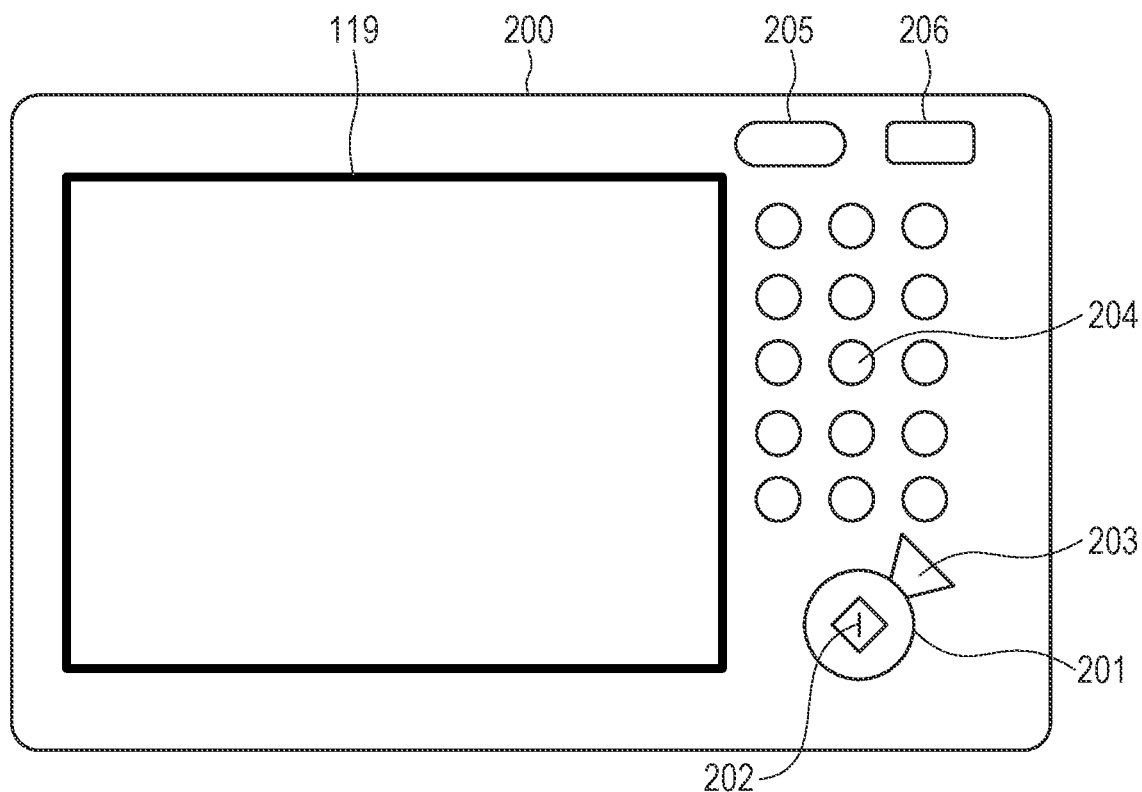
FIG. 2 is a diagram illustrating an example of a hardware configuration of an operation panel.

FIG. 2 is a diagram illustrating an example of the overview of the operation panel 200. The display 119 and the hard key 123 are arranged adjacent to each other on the operation panel 200.

Various buttons operated by the user will be described. A start key 201 is used for an instruction of start of a reading operation of a document or the like, for example. LEDs 202 of two colors of green and red are provided at the center of the start key 201, and the color thereof indicates whether or not the start key 201 is ready for use. A stop key 203 is used for operation to stop an active operation, for example. Number keys 204 are formed of number buttons and character buttons and are used for an instruction of setting of the number of copies, screen switching of the display 119, and the like, for example. A home key 205 is used for calling a home window described later. A display mode switching key 206 is used for switching between the standard UI screen and the universal UI screen. These various buttons are examples and may be arranged as software buttons on the display 119, for example.

Figure 3:
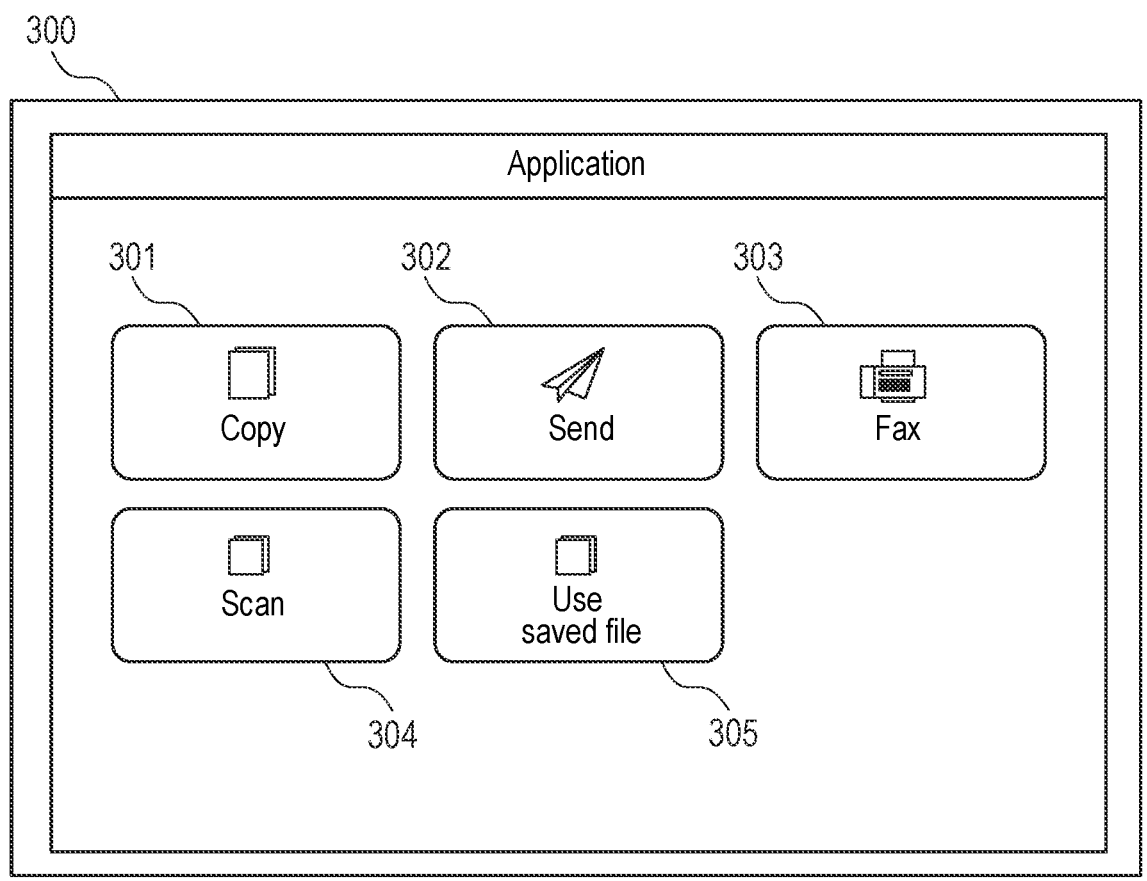
FIG. 3 is a diagram illustrating an example of a display screen of a standard UI of a home window application.

FIG. 3 is a diagram illustrating an example of a standard UI screen 300 displayed on the display 119 of the MFP 101 when the home key 205 is selected and it is determined that the standard UI screen is displayed in accordance with a process of the flowchart of FIG. 7 described later. The standard UI screen 300 is a screen when the home window is displayed with the standard UI and is used for displaying application buttons 301 to 305 corresponding to respective applications installed in the MFP 101.

In FIG. 3, a copy application button 301, a send application button 302, a fax application button 303, a scan application button 304, and a use of saved file application button 305 are displayed as an example.

The application buttons 301 to 305 are buttons used for starting up applications. In response to accepting selection of any of these buttons from the user, the CPU 111 starts up an application associated with each selected button.

Figure 4:
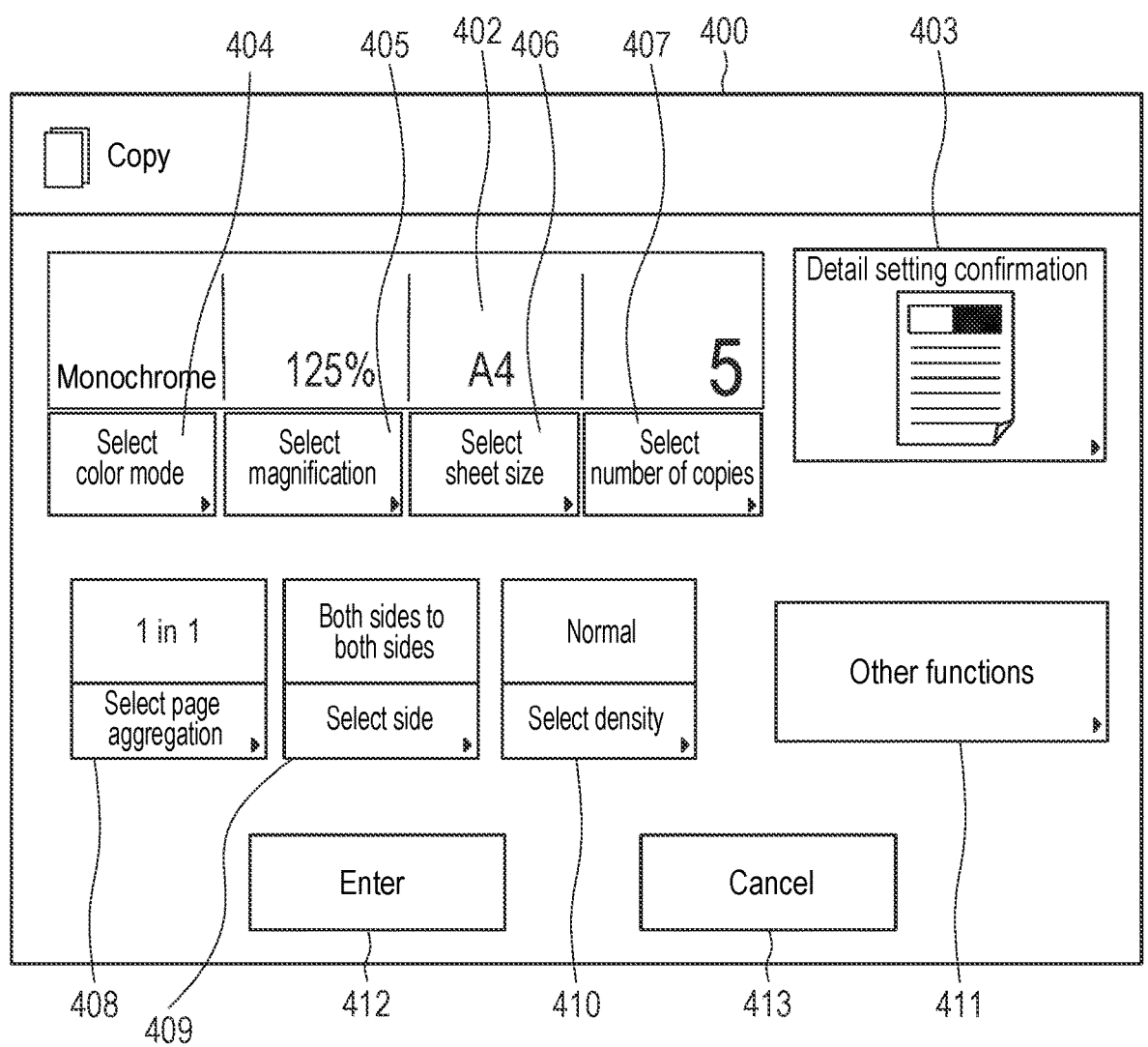
FIG. 4 is a diagram illustrating an example of a display screen of the standard UI of a copy application.
Figure 7:
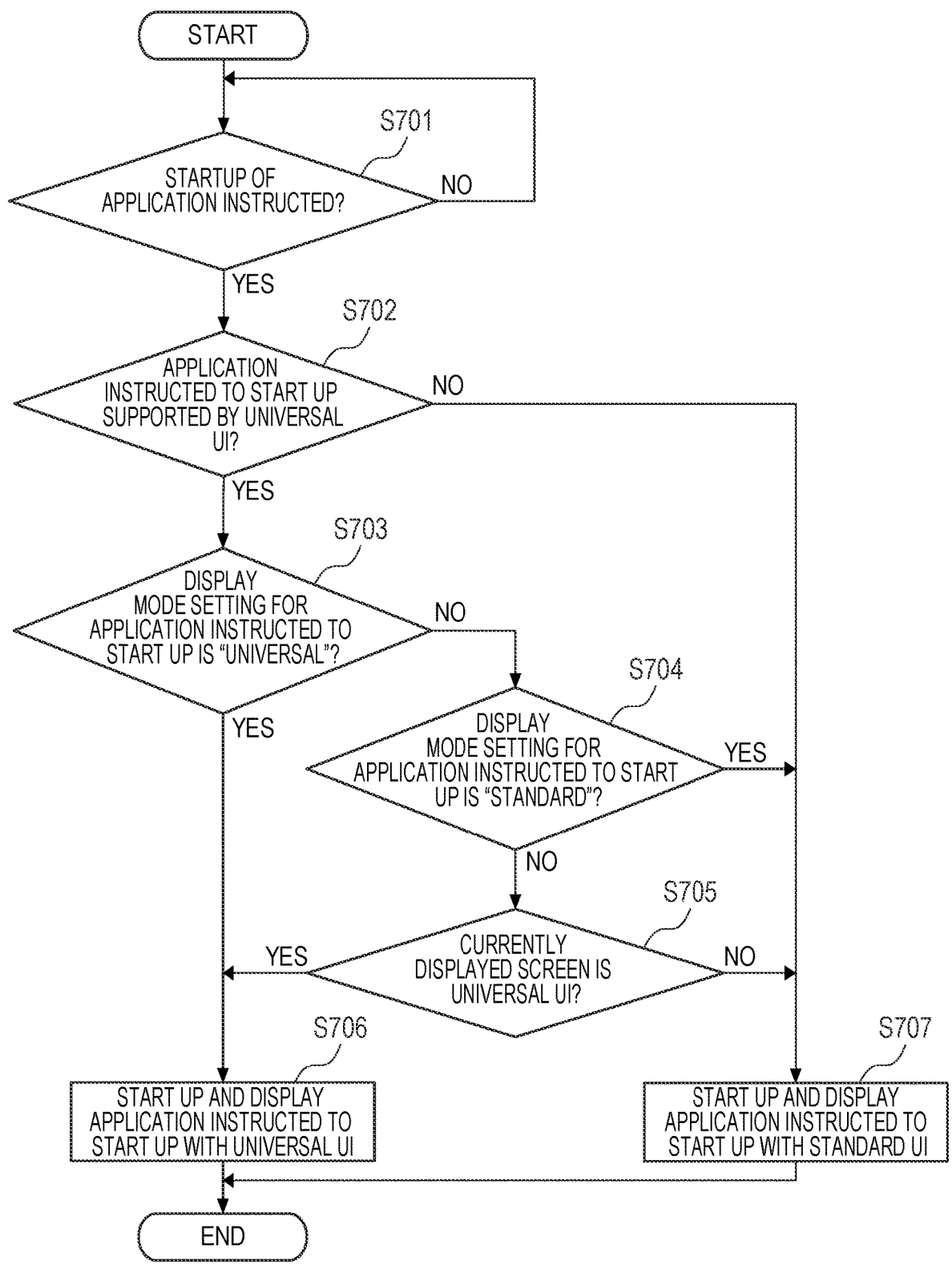
FIG. 7 is a flowchart illustrating an example of information processing from the time startup of an application is instructed to the time a screen is displayed.

FIG. 4 is a diagram illustrating an example of a standard UI screen 400 displayed on the display 119 of the MFP 101 when the copy application button 301 is selected and it is determined that the standard UI screen is displayed in accordance with the process of the flowchart illustrated in FIG. 7. A setting value display region 402 is a region that displays each setting value of a color mode, a magnification, a sheet size, and the number of copies. A detail confirmation button 403 is a button in which the current setting information is represented as a preview and is used for displaying a detail confirmation screen 500 when selected. Setting selection buttons 404 to 407 are buttons used for setting the color mode, the magnification, the sheet size, and the number of copies, respectively. Setting display/selection buttons 408 to 410 are buttons used for displaying setting values of page aggregation, the side, and the density in the upper part, respectively, and setting these values in the lower part. Other functions button 411 is a button used for displaying a window (not illustrated) on which another more detailed setting (for example, setting of stapler) is performed. An enter button 412 is a button used for starting execution of a job when selected. A cancel button 413 is a button used for closing the standard UI screen 400 when selected.

FIG. 5 is a diagram illustrating an example of the detail confirmation screen 500 displayed when the detail confirmation button 403 on the standard UI screen 400 is selected. Note that, although all the items of the current setting information are listed on the detail confirmation screen 500 in the present embodiment, the embodiment is not limited thereto. For example, only one or more items classified into a particular condition may be listed, for example, only one or more items whose setting values have been changed from default values may be listed.

An all-setting value display list 501 is a list that displays respective setting values for all the items of the current setting information. An enter button 502 is a button used for starting execution of a job when selected. A cancel button 503 is a button used for closing the detail confirmation screen 500 when selected.

Figure 6:
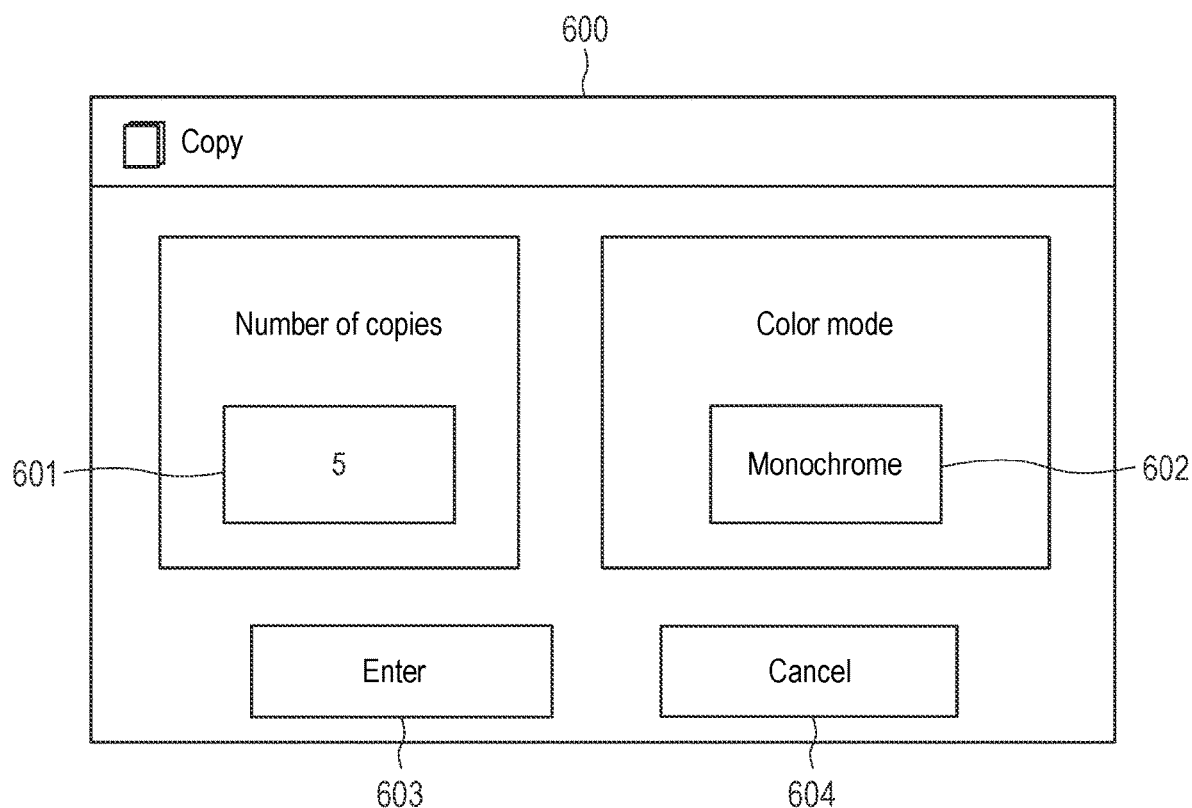
FIG. 6 is a diagram illustrating an example of a display screen of a universal UI of the copy application.

FIG. 6 is a diagram illustrating an example of a universal UI screen 600 displayed on the display 119 of the MFP 101 when the copy application button 301 is selected and it is determined that the universal UI screen is displayed in accordance with a process of the flowchart illustrated in FIG. 7. A copy number setting button 601 is a button used for setting and displaying the number of copies. A color mode setting button 602 is a button used for setting and displaying a color mode. An enter button 603 is a button used for starting execution of a job when selected. A cancel button 604 is a button used for closing the universal UI screen 600 when selected.

As can be seen from FIG. 4 and FIG. 6, in the universal UI screen 600, it is possible to operate, with higher visibility, only some of the typical settings out of settings that can be changed in the standard UI screen 400. In other words, in the universal UI screen 600, it is not possible to change detailed settings that can be changed in the standard UI screen 400 (for example, settings of page aggregation, density, stapler, or the like). Note that, although change of settings is enabled for only the number of copies and the color mode in the universal UI screen 600 in the present embodiment, the embodiment is not limited thereto. For example, change of settings for only the magnification, the sheet size, and the density may be enabled.

FIG. 7 is a flowchart illustrating an example of information processing from the time startup of an application is instructed to the time a screen of the application is displayed on the display 119. The operation in which startup of an application is instructed means that any of the application buttons 301 to 305 corresponding to respective applications displayed in the standard UI screen 300 displayed on the display 119 is selected, for example. Note that the flowchart is implemented when the CPU 111 receives a notification of detection of selection of any of the application buttons 301 to 305 from the touch panel 118 and thereby performs a process based on a program related to an application startup process stored in the ROM 113. The CPU 111 repeatedly performs the process of the flowchart at a predetermined interval (for example, every 0.3 seconds) during the MFP 101 being powered on.

In S701, the CPU 111 determines whether or not startup of the application is instructed. If not instructed, the CPU 111 returns to the process of S701. On the other hand, if instructed, the CPU 111 proceeds with the process to S702.

In S702, the CPU 111 references a universal UI support column 802 of a display mode information table 800 for applications stored in the ROM 113 or the RAM 112 and thereby determines whether or not the application instructed to start up is supported by the universal UI. If supported, the CPU 111 proceeds with the process to S703. On the other hand, if not supported, the CPU 111 proceeds with the process to S707.

In S703, the CPU 111 references a display mode setting column 803 of the display mode information table 800 for applications stored in the ROM 113 or the RAM 112 and thereby determines whether or not the setting of a display mode for the application instructed to start up is "universal". If the setting is "universal", the CPU 111 proceeds with the process to S706. On the other hand, if the setting is not "universal" (that is, if the setting is "non-specified (auto)" or "standard"), the CPU 111 proceeds with the process to S704.

In S704, the CPU 111 references a display mode setting column 803 of the display mode information table 800 for applications stored in the ROM 113 or the RAM 112 and thereby determines whether or not the setting of a display mode for the application instructed to start up is "standard". If the setting is "standard", the CPU 111 proceeds with the process to S707. On the other hand, if the setting is not "standard" (that is, if the setting is "non-specified (auto)"), the CPU 111 proceeds with the process to S705.

In S705, the CPU 111 determines whether or not the screen currently displayed on the display 119 is the universal UI screen. If it is the universal UI screen, the CPU 111 proceeds with the process to S706. On the other hand, if it is not the universal UI screen (that is, if it is the standard UI screen), the CPU 111 proceeds with the process to S707.

In S706, the CPU 111 starts up the application instructed to start up, displays the application with the universal UI, and ends the series of processes of the flowchart.

In S707, the CPU 111 starts up the application instructed to start up and displays the application with the standard UI, and ends the series of processes of the flowchart.

FIG. 8 is a diagram illustrating an example of the display mode information table 800 for applications stored in the ROM 113 or the RAM 112. Information on the names of respective applications installed in the MFP 101 is stored in an application name column 801. Information as to whether or not respective applications are supported by the universal UI is stored in the universal UI support column 802. Information on setting values of the display mode of respective applications is stored in the display mode setting column 803. When the user operates a display mode setup screen 900 for applications and changes the setting value of the display mode of each application, the information in the display mode setting column 803 is rewritten in accordance with the change. In the display mode setting column 803, "non-specified (auto)", "universal", or "standard" is stored for the application supported by the universal UI, and "N/A" is stored for the application not supported by the universal UI.

Note that, in the present embodiment, since the display mode information table 800 for the application is not a setting information table on a user basis but an administrator setting (device setting) information table, the display mode information table 800 for the application is used regardless of which user uses the MFP 101. In an environment where each user logs in and then uses the MFP 101 by using each authentication information, however, the display mode information table 800 for applications may be provided on a user basis. When the display mode information table 800 for applications is provided on a user basis, the CPU 111 can customize a display mode of each application on a user basis by using the display mode information table 800 for applications for the user who is currently logged in the MFP 101.

Figure 9:
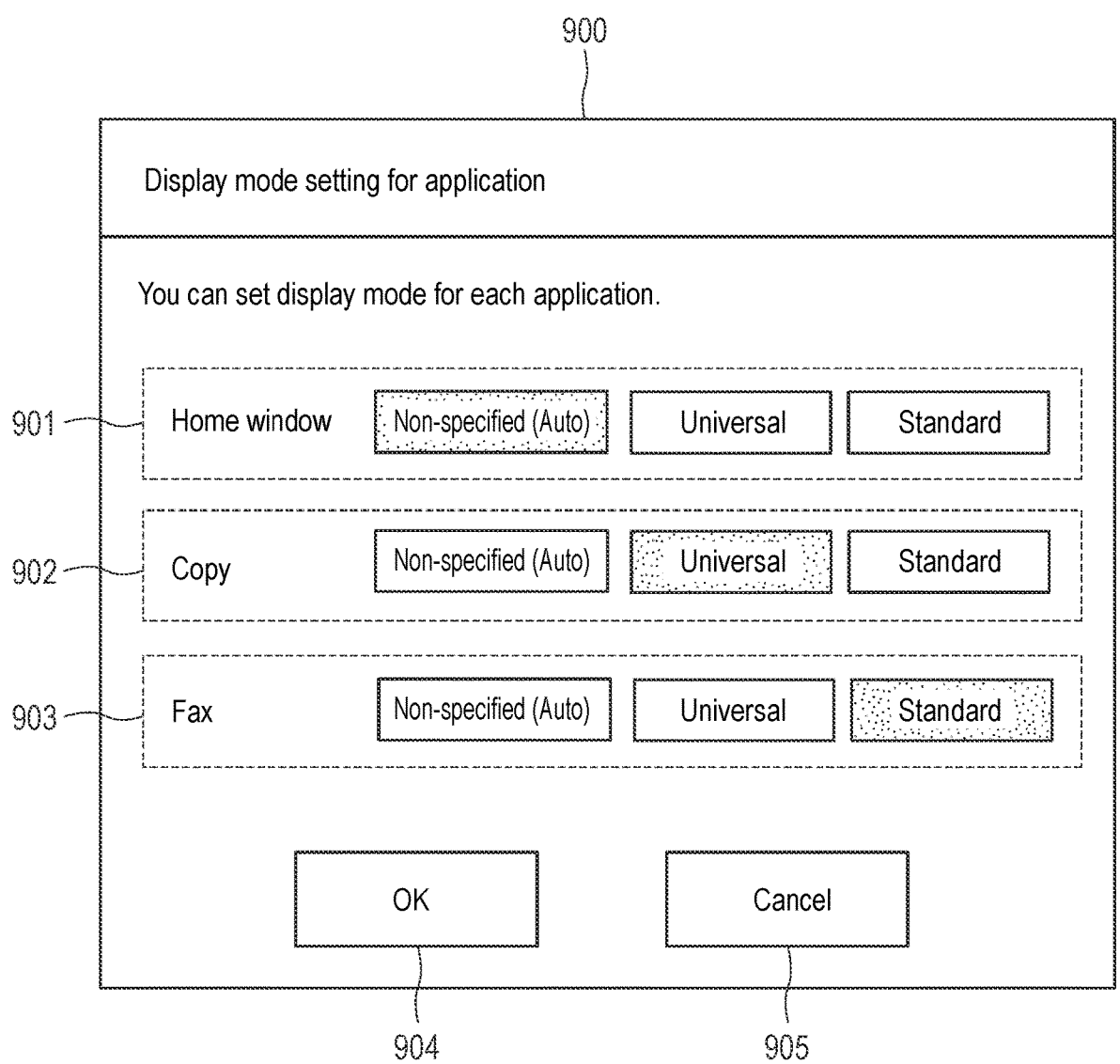
FIG. 9 is a diagram illustrating an example of a display mode setup screen for applications.

FIG. 9 is a diagram illustrating an example of the display mode setup screen 900 for applications. In this screen, it is possible to set a display mode of each application supported by the universal UI out of applications installed in the MFP 101. Note that an application not supported by the universal UI is not displayed as setting items of this screen. In a home window application setting region 901, a copy application setting region 902, and a fax application setting region 903, it is possible to set the display modes when a home window application, a copy application, and a fax application are started up and displayed on the display 119, respectively. If the setting value is set to "non-specified (auto)", when the application of interest is started up, the application is displayed in the same display mode as that for the screen displayed at the startup instruction on the display 119 in accordance with the process of the flowchart illustrated in FIG. 7. For example, if the setting value of the display mode of the home window application is "non-specified (auto)", in response to the home key 205 being selected when the copy application is displayed with the universal UI, the home window application is displayed with the universal UI. In contrast, in response to the home key 205 being selected when the copy application is displayed with the standard UI, the home window application is displayed with the standard UI. If the setting value is set to "universal", when the application of interest is started up, the application is always displayed with the universal UI in accordance with the process of the flowchart illustrated in FIG. 7. If the setting value is set to "standard", when the application of interest is started up, the application is always displayed with the standard UI in accordance with the process of the flowchart illustrated in FIG. 7. An OK button 904 is a button used for, when selected, writing a setting value of the display mode of each currently selected application ("non-specified (auto)", "universal", or "standard") to the ROM 113 or the RAM 112. A cancel button 905 is a button used for closing the display mode setup screen 900 for the application when selected.

Although the configuration in which a display mode for the home window and the setup screens for copy and fax is set is illustrated in the display mode setup screen 900 illustrated in FIG. 9, a setting item arranged out of the display mode setup screen 900 may be displayed and set by scrolling of the display mode setup screen 900. For example, when a scan application is an application supported by the universal UI display, the scan application may be displayed on the display mode setup screen 900 by scrolling of setting items used for setting a display mode of the scan application.

Further, although the order of operations is such that it is determined whether or not the setting of the display mode for an application instructed to start up is "universal" and it is then determined whether or not the setting is "standard" in S703 and S704 of FIG. 7, the order of determination of the display mode is not particularly limited. The same applies to a case where "non-specified (auto)" is included in the display mode.

By employing the configuration of the first embodiment, it is possible to set a display mode of various setup screens displayed by a plurality of applications provided in the MFP 101 on a single screen (the display mode setup screen 900).

According to the method described above, the setting of the display mode of each application can be fixed to any of "standard" and "universal". Accordingly, it is possible to display each application in a display mode intended by a user without requiring a display mode switching operation even when the user switches applications.

First Modified Example

Next, a first modified example will be described.

In the first embodiment, as described with FIG. 7 and FIG. 8, when an application supported by the universal UI is started up, if the setting of the display mode is "non-specified (auto)", the application is displayed in the same display mode as that of the screen displayed on the display 119 at the time of the startup instruction. On the other hand, in the first modified example, when the application supported by the universal UI is started up, if the setting of the display mode is "non-specified (auto)", the application is displayed in the same display mode as the display mode in which the application was previously displayed. An operation flow of the MFP 101 in the first modified example will be described with FIG. 10.

Figure 10:
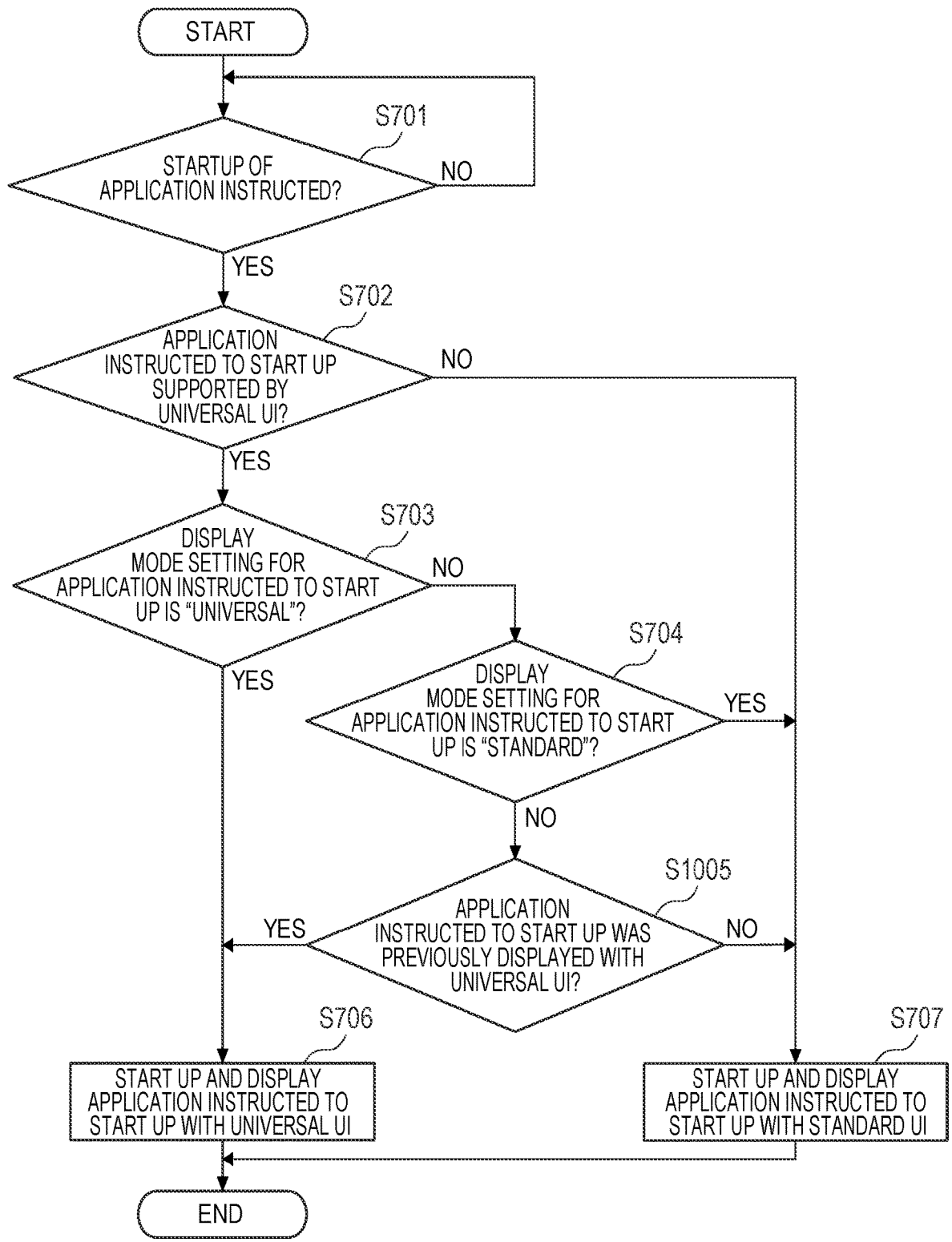
FIG. 10 is a flowchart illustrating an example of information processing from the time startup of an application is instructed to the time a screen is displayed.

FIG. 10 is a flowchart illustrating an example of information processing from the time startup for an application is instructed to the time a screen of the application is displayed on the display 119. The operation in which startup of an application is instructed means that any of the application buttons 301 to 305 corresponding to respective applications displayed in the standard UI screen 300 displayed on the display 119 is selected, for example. Note that the flowchart is implemented when the CPU 111 receives a notification of detection of selection of any of the application buttons 301 to 305 from the touch panel 118 and thereby performs a process based on a program related to an application startup process stored in the ROM 113. The CPU 111 repeatedly performs the process of the flowchart at a predetermined interval (for example, every 0.3 seconds) during the MFP 101 being powered on.

S701 to S704 and S706 to S707 correspond to those described with FIG. 7 of the first embodiment.

In S1005, the CPU 111 references a display mode setting column 1104 of a display mode information table 1100 for applications stored in the ROM 113 or the RAM 112. Thereby, the CPU 111 determines whether or not the screen when the application instructed to start up was previously displayed was the universal UI screen. If it was the universal UI screen, the CPU 111 proceeds with the process to S706. On the other hand, if it was not the universal UI screen (that is, if it was the standard UI screen), the CPU 111 proceeds with the process to S707. That is, if the previously displayed screen was the universal UI screen, the CPU 111 decides to display the next screen with the universal UI. Further, if the previously displayed screen was the standard UI screen, the CPU 111 decides to display the next screen with the standard UI.

FIG. 11 is a diagram illustrating an example of the display mode information table 1100 for applications stored in the ROM 113 or the RAM 112. Columns 801 to 803 correspond to those described with FIG. 8 of the first embodiment. In a display mode setting column 1104, information on the display mode when each application was previously displayed on the display 119 is stored. For example, it is assumed that the user selects the copy application button 301, the copy application is started up, and the standard UI screen 400 is displayed. It is assumed that the user then selects the display mode switching key 206 to switch the screen to the universal UI screen 600 and then further selects the home key 205 to switch the screen to the home window. In response, at this point of time (a point of time when the display of the copy application window ends), the information on the display mode setting column 1104 of the copy application is rewritten to "universal". In the display mode setting column 1104, "universal" or "standard" is stored for applications supported by the universal UI, and "N/A" is stored for applications not supported by the universal UI.

Note that, in the first modified example, since the display mode information table 1100 for the application is not a setting information table on a user basis but an administrator setting (device setting) information table, the display mode information table 1100 for the application is used regardless of which user uses the MFP 101. In an environment where each user logs in and then uses the MFP 101 by using each authentication information, however, the display mode information table 1100 for applications may be provided on a user basis. When the display mode information table 1100 for applications is provided on a user basis, the CPU 111 can customize a display mode of each application on a user basis by using the display mode information table 1100 for applications for the user who is currently logged in the MFP 101.

According to the method described above, when a setting value is "non-specified (auto)" in the display mode setup screen 900 for an application and when the application is started up, the application is displayed in the same display mode as that when the application was previously displayed in accordance with the process of the flowchart illustrated in FIG. 10.

Other Embodiments

Embodiments of the present disclosure can also be realized by a computerized configurations of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computerized configurations of the system or apparatus by, for example, reading out and executing the computer executable instructions from the storage medium to perform the functions of one or more of the above-described embodiments and/or controlling the one or more circuits to perform the functions of one or more of the above-described embodiments. The computerized configurations may comprise one or more processors, one or more memories, circuitry, or a combination thereof (e.g., central processing unit (CPU), micro processing unit (MPU), or the like) and may include a network of separate computers or separate processors to read out and execute the computer executable instructions. The computer executable instructions may be provided to the computerized configurations, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the scope of the disclosure is not limited to the disclosed exemplary embodiments. The scope of the following claims is to be accorded the broadest interpretation so as to encompass all such modifications and equivalent structures and functions.

As described above, according to each embodiment described above, it is possible to display each application in a display mode intended by a user without requiring the user to perform a display mode switching operation.

This application claims the benefit of Japanese Patent Application No. 2019-187024, filed Oct. 10, 2019, which is hereby incorporated by reference herein in its entirety.

What is claimed is:

1. An image processing apparatus having a plurality of functions, the image processing apparatus comprising:
   at least one memory that stores instructions; and
   at least one processor that executes the instructions to perform:
   individually setting a display mode for each of setup screens corresponding to each of the plurality of functions, wherein the display mode set individually for each of the setup screens is selected from a plurality of display modes that includes at least a first display mode and a second display mode; and
   displaying a setup screen corresponding to a selected function that is selected from the plurality of functions by a user, wherein the displayed setup screen is displayed in the display mode that was preset individually for the setup screen corresponding to the selected function.

2. The image processing apparatus according to claim 1, wherein the second display mode includes fewer setting items than the first display mode.

3. The image processing apparatus according to claim 1, wherein the plurality of functions includes a first function and a second function, and
wherein the at least one processor is further operable to perform:
setting the first display mode for a first setup screen corresponding to the first function; and
setting the second display mode for a second setup screen corresponding to the second function.

4. The image processing apparatus according to claim 3, wherein, in case that the first display mode is set for the first setup screen and the second display mode is set for the second setup screen, the first setup screen is displayed in the first display mode if the first function is selected, and the second setup screen is displayed in the second display mode if the second function is selected.

5. A non-transitory computer-readable storage medium storing a program to cause a computer to operate as each unit of the image processing apparatus according to claim 1.

6. The image processing apparatus according to claim 1, wherein, in receipt of an operation of selecting a software key from a user through a menu screen containing a plurality of software keys for executing each of the plurality of functions, a setup screen corresponding to the selected function is displayed.

7. The image processing apparatus according to claim 6, wherein the at least one processor further performs setting a display mode for the menu screen.

8. The image processing apparatus according to claim 1,
wherein the at least one processor further performs displaying an operation screen for setting a display mode for each of setup screens corresponding to each of the plurality of functions, and
wherein at least one processor further performs the setting of the display modes based on an instruction received from the user through the operation screen.

9. The image processing apparatus according to claim 1, wherein the setting of the display mode is performed for each user.

10. The image processing apparatus according to claim 1, wherein, if a function that is not set to be associated with the first display mode or the second display mode is selected, the display mode being used when selecting the function is used to display a setup screen corresponding to the selected function.

11. The image processing apparatus according to claim 1, wherein, if a function that is not set to be associated with the first display mode or the second display mode is selected, the display mode that was previously used for the selected function is used to display a setup screen corresponding to the selected function.

12. The image processing apparatus according to claim 1, wherein, if a function having only a single display mode is selected, the single display mode is used to display a setup screen corresponding to the selected function.

13. The image processing apparatus according to claim 1, wherein the first display mode is a standard mode, and the second display mode is a universal mode that has fewer configurable setting items than the standard mode.

14. The image processing apparatus according to claim 1, wherein the plurality of functions includes at least one of copy, data transmission, facsimile, and scanning functions.

15. The image processing apparatus according to claim 1, wherein the setting of the display mode is preset by the user.

16. An information processing method performed by an image processing apparatus having a plurality of functions, the information processing method comprising:
a setting step of individually setting a display mode for each of setup screens corresponding to each of the plurality of functions, wherein the display mode set individually for each of the setup screens is selected from a plurality of display modes that includes at least a first display mode and a second display mode; and
a display step of displaying a setup screen corresponding to a selected function that is selected from the plurality of functions by a user, wherein the displayed setup screen is displayed in the display mode that was preset individually for the setup screen corresponding to the selected function.

* * * * *